(12) United States Patent
Liu et al.

(10) Patent No.: US 12,515,411 B2
(45) Date of Patent: Jan. 6, 2026

(54) METHOD AND APPARATUS FOR AUTOMATICALLY IMPROVING PRINTING EFFECT, DEVICE, AND STORAGE MEDIUM

(71) Applicant: Shenzhen Creality 3D Technology Co., Ltd., Shenzhen (CN)

(72) Inventors: Hui-Lin Liu, Shenzhen (CN); Jing-Ke Tang, Shenzhen (CN); Chun Chen, Shenzhen (CN); Dan-Jun Ao, Shenzhen (CN); Wen-Bin Wang, Shenzhen (CN)

(73) Assignee: Shenzhen Creality 3D Technology Co., Ltd., Shenzhen (CN)

( * ) Notice: Subject to any disclaimer, the term of this patent is extended or adjusted under 35 U.S.C. 154(b) by 365 days.

(21) Appl. No.: 18/029,650

(22) PCT Filed: Dec. 28, 2020

(86) PCT No.: PCT/CN2020/140125
§ 371 (c)(1),
(2) Date: Mar. 30, 2023

(87) PCT Pub. No.: WO2022/068107
PCT Pub. Date: Apr. 7, 2022

(65) Prior Publication Data
US 2023/0382052 A1 Nov. 30, 2023

(30) Foreign Application Priority Data
Sep. 30, 2020 (CN) .......................... 202011058611.3

(51) Int. Cl.
*B29C 64/393* (2017.01)
*B33Y 30/00* (2015.01)
(Continued)

(52) U.S. Cl.
CPC ............ *B29C 64/393* (2017.08); *B33Y 30/00* (2014.12); *B33Y 50/02* (2014.12)

(58) Field of Classification Search
CPC ... B29C 64/393; B29C 64/245; B29C 64/386; B29C 64/20; B33Y 30/00; B33Y 50/02;
(Continued)

(56) References Cited

U.S. PATENT DOCUMENTS 10,046,500 B2    8/2018    Shen et al.
10,496,762 B2 *  12/2019   Gotou .................... B25J 9/1697
(Continued)

FOREIGN PATENT DOCUMENTS

CN    104085112 A    10/2014
CN    105904729 A    8/2016
(Continued)

OTHER PUBLICATIONS

Qie Longfei et al; Quantitative suggestions for build orientation selection; The International Journal of Advanced Manufacturing Technology, Springer, London; Jun. 26, 2018; pp. 1831-1845.

*Primary Examiner* — Michael J Brown
(74) *Attorney, Agent, or Firm* — ScienBiziP, P.C.

(57) ABSTRACT

Disclosed in the present invention are a method and apparatus for automatically improving printing effect, a device, and a storage medium. The method comprises: receiving an import request of a 3D model, and parsing a triangle patch comprised in the 3D model; acquiring all angular points of the 3D model according to the triangle patch, subtracting a minimum angular point from a maximum angular point to obtain a bounding box of the 3D model, creating, an axis perpendicular to the bounding box; using the axis and a platform inclination angle to calculate a quaternion related to the rotation of the 3D model; multiplying a space matrix of the bounding box of the 3D model by the rotation matrix enabling a printing path to be perpendicular to the bounding
(Continued)

box. The model is imported to automatically keep the inclination angle consistent with a platform, thereby improving the printing effect.

10 Claims, 6 Drawing Sheets

(51) Int. Cl.
    *B33Y 50/02*     (2015.01)
    *B22F 10/80*     (2021.01)

(58) Field of Classification Search
    CPC ..... B33Y 10/00; B33Y 50/00; B22F 2999/00; B22F 10/80; B22F 12/37; G06F 2113/10; G06F 2119/18
    USPC .......................................................... 700/118
    See application file for complete search history.

(56) References Cited

U.S. PATENT DOCUMENTS

| | | |
|---|---|---|
| 10,518,473 B2 | 12/2019 | Huang et al. |
| 2010/0149179 A1* | 6/2010 | de Aguiar ............... H03M 7/30 345/473 |
| 2015/0290881 A1 | 10/2015 | Ederer et al. |
| 2020/0047411 A1 | 2/2020 | Schurmann |
| 2020/0320747 A1* | 10/2020 | Izumi ....................... G06T 3/00 |

FOREIGN PATENT DOCUMENTS

| | | |
|---|---|---|
| CN | 106780350 A | 5/2017 |
| CN | 107089008 A | 8/2017 |
| CN | 107379530 A | 11/2017 |
| CN | 107798734 A | 3/2018 |
| CN | 108481741 A | 9/2018 |
| CN | 108846801 A | 11/2018 |
| CN | 108973113 A | 12/2018 |
| CN | 109394410 A | 3/2019 |
| CN | 110154391 A | 8/2019 |
| CN | 209813079 U | 12/2019 |
| CN | 111347676 A | 6/2020 |
| EP | 2173538 A2 | 4/2010 |
| KR | 20200084931 A | 7/2020 |
| WO | 2017/106965 A1 | 6/2017 |
| WO | 2018/194446 A1 | 10/2018 |

\* cited by examiner

METHOD AND APPARATUS FOR AUTOMATICALLY IMPROVING PRINTING EFFECT, DEVICE, AND STORAGE MEDIUM

FIELD

The present disclosure relates to the field of three-dimensional (3D) printing technology, in particular to a method and an apparatus for automatically improving printing effect, a device, and a storage medium.

BACKGROUND

With the development of 3D printing technology, more and more enterprises and individuals are beginning to use 3D printing technology to produce and design their own products. The 3D printers have limited printing space and limited print model size, there are currently popular 3D printers on the market that can print infinite length models. However, because the 3D printers invert the Z axis, the printed model has a certain inclination angle, which can lead to poor printing performance compared to conventional printers. This issue is currently an urgent issue to be addressed.

The information disclosed in this part of the background technology is only intended to deepen the understanding of the overall background technology of the invention, and should not be deemed to acknowledge or imply in any form that the information constitutes a prior art that is already well known to those skilled in the art.

SUMMARY

The embodiment of the present disclosure provides a method and apparatus for automatically improving the printing effect, a device, and a storage medium, aiming to automatically adjust the inclination angle of a model according to the inclination angle of the printer platform, so that the model can still achieve the vertical printing effect of a conventional printer, and achieve the purpose of improving the printing effect.

In a first aspect, the embodiment of the present disclosure provides a method for automatically improving printing effect, which is applied to a 3D printer, the method may include the following steps:
establishing a space coordinate system related to a three-dimensional (3D) printer;
receiving an import request of a 3D model, and parsing a triangle patch comprised in the 3D mode;
acquiring all angular points of the 3D model according to the triangle patch, subtracting a minimum angular point from a maximum angular point to obtain a bounding box of the 3D model and a central point of the 3D model, and creating, according to the central point, an axis perpendicular to the bounding box;
receiving a platform inclination angle definition request of the 3D printer, and using the axis and a platform inclination angle to calculate a quaternion related to the rotation of the 3D model;
obtaining a rotation matrix according to the quaternion, multiplying a space matrix of the bounding box of the 3D model by the rotation matrix to obtain the space matrix of the bounding box after rotation, performing a slicing operation by using 3D printing software, and enabling a printing path to be perpendicular to the bounding box.

In one possible embodiment, the step of receiving an import request of a 3D model further includes establishing a space coordinate system related to the 3D printer.

In one possible embodiment, the subtracting a minimum angular point from a maximum angular point to obtain a bounding box of the 3D model and a central point of the 3D model may include: calculating the space matrix of the bounding box based on the space coordinate system.

In one possible embodiment, the using the axis and a platform inclination angle to calculate a quaternion related to the rotation of the 3D model may include: making the quaternion successively take a cosine value of the platform inclination angle, a product of an axis X coordinate and a sine value of the platform inclination angle, a product of an axis Y coordinate and the sine value of the platform inclination angle, and a product of an axis Z coordinate and the sine value of the platform inclination angle as real numbers.

In one possible embodiment, the obtaining a rotation matrix according to the quaternion may include: deriving the rotation matrix from the quaternion.

In another aspect, the present disclosure further provides an apparatus for automatically improving printing effect, the apparatus the following units:
a coordinate establishment unit is configured for establishing a space coordinate system related to a 3D printer;
a model analysis unit is configured for receiving an import request of a 3D model and parsing a triangle patch comprised in the 3D mode;
a parameter acquisition unit is configured for obtaining all angular points of the 3D model according to the triangle patch, subtracting a minimum angular point from a maximum angular point to obtain a bounding box of the 3D model and a central point of the 3D model, and creating, according to the central point, an axis perpendicular to the bounding box;
an angle conversion unit is configured for receiving a platform inclination angle definition request of the 3D printer and using the axis and a platform inclination angle to calculate a quaternion related to the rotation of the 3D model; and
a rotation realization unit is configured for obtaining a rotation matrix according to the quaternion, multiplying a space matrix of the bounding box of the 3D model by the rotation matrix to obtain the space matrix of the bounding box after rotation, performing a slicing operation by using a 3D printing software, and enabling a printing path to be perpendicular to the bounding box.

In one possible embodiment, the parameter acquisition unit comprises a space matrix acquisition unit, the space matrix acquisition unit is configured to calculate the space matrix of the bounding box based on the space coordinate system.

In one possible embodiment, the angle conversion unit includes a quaternion parameter definition unit, the quaternion parameter definition unit is configured to make the quaternion successively take a cosine value of the platform inclination angle, a product of an axis X coordinate and a sine value of the platform inclination angle, a product of an axis Y coordinate and the sine value of the platform inclination angle, and a product of an axis Z coordinate and the sine value of the platform inclination angle as real numbers.

In one possible embodiment, the rotation realization unit includes a rotation matrix derivation unit, the rotation matrix derivation unit is configured to derivates the rotation matrix from the quaternion. In a third aspect, the present disclosure provides a computer device, the computer device includes a memory and a processor, the memory stores a computer program, and when the processor executes the computer program, the method for automatically improving printing effect as described in any of the above is implemented.

In a fourth aspect, the present disclosure further provides a storage medium that stores a computer program, the computer program includes program instructions, when the processor executes the program instruction, the method for automatically improving printing effect as described in any of the above is implemented.

Compared to the prior art, the beneficial effect of the present disclosure is: by receiving an import request of a 3D model and parsing a triangle patch comprised in the 3D mode, obtaining all angular points of the 3D model according to the triangle patch, subtracting a minimum angular point from a maximum angular point to obtain a bounding box of the 3D model and a central point of the 3D model, and creating, according to the central point, an axis perpendicular to the bounding box, receiving a platform inclination angle definition request of the 3D printer and using the axis and a platform inclination angle to calculate a quaternion related to the rotation of the 3D model, obtaining a rotation matrix according to the quaternion, multiplying a space matrix of the bounding box of the 3D model by the rotation matrix to obtain the space matrix of the bounding box after rotation, performing a slicing operation by using a 3D printing software, and enabling a printing path to be perpendicular to the bounding box. The imported model automatically maintains a consistent inclination angle with the platform, which has better economic value for improving the printing effect of the currently popular Z-axis infinite printer in the market.

The present disclosure is further described below in conjunction with the accompanying drawings and specific embodiments.

BRIEF DESCRIPTION OF THE DRAWINGS

In order to more clearly illustrate the technical solution of the embodiment of the present disclosure, the accompanying drawings required in the description of the embodiment will be briefly introduced below, obviously, the drawings in the following description are some embodiments of the present disclosure, for those skilled in the art, other drawings can also be obtained from these drawings without any creative work.

DETAILED DESCRIPTION

The following will provide a clear and complete description of the technical solution in the embodiments of the present disclosure in conjunction with the accompanying drawings, obviously, the described embodiments are part of the embodiments of the present disclosure, not all of them. Based on the embodiments in the present invention, all other embodiments obtained by ordinary technicians in the art without creative work fall within the scope of protection of the present disclosure.

It should be understood that when used in this specification and the appended claims, the terms "including" and "containing" indicate the presence of the described features, entirety, steps, operations, elements, and/or components, but do not exclude the presence or addition of one or more other features, entirety, steps, operations, elements, components, and/or collections thereof.

It should also be understood that the terms used in this specification of the present disclosure are only for the purpose of describing specific embodiments and are not intended to limit the present disclosure. As used in the description of the present disclosure and the appended claims, the singular forms of "a", "one", and "the" are intended to include the plural forms, unless the context clearly indicates otherwise.

It should also be further understood that the term "and/or" as used in the specification of the present disclosure and the appended claims refers to any combination of one or more of the associated listed items and all possible combinations and includes these combinations.

Figure 2:
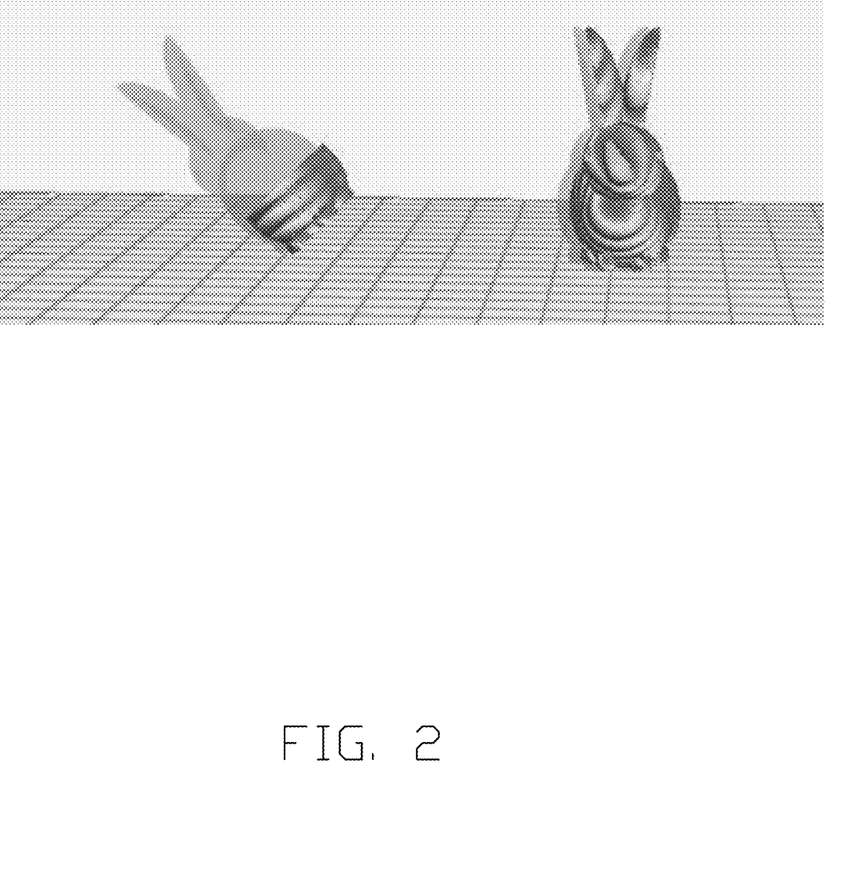
FIG. 2 is another scenario diagram of the method for automatically improving printing effect according to an embodiment of the present disclosure.
Figure 3:
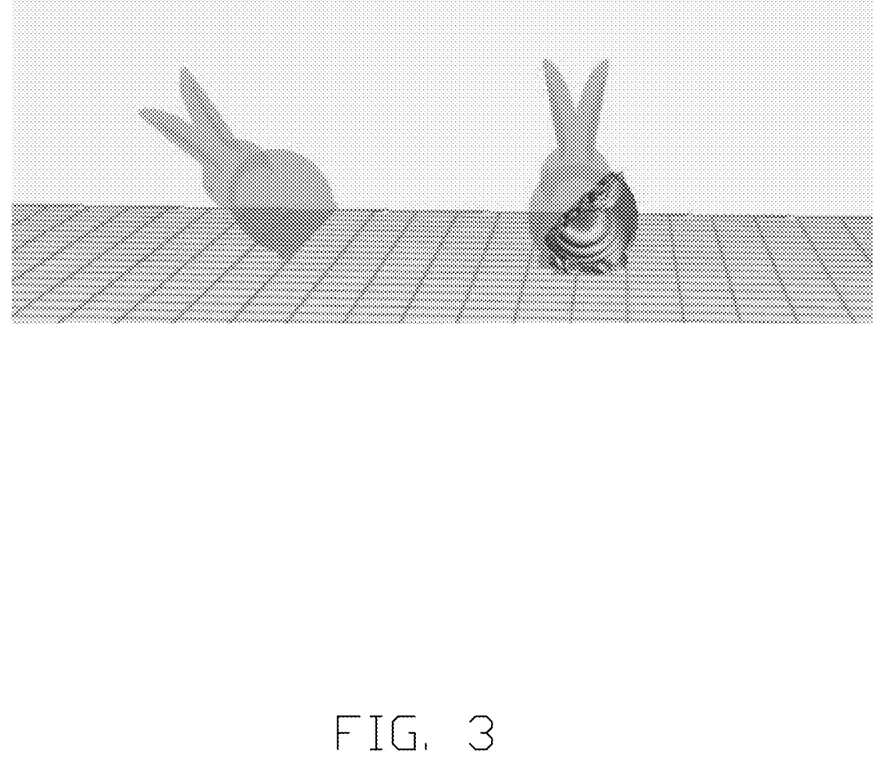
FIG. 3 is another scenario diagram of the method for automatically improving printing effect according to an embodiment of the present disclosure.
Figure 4:
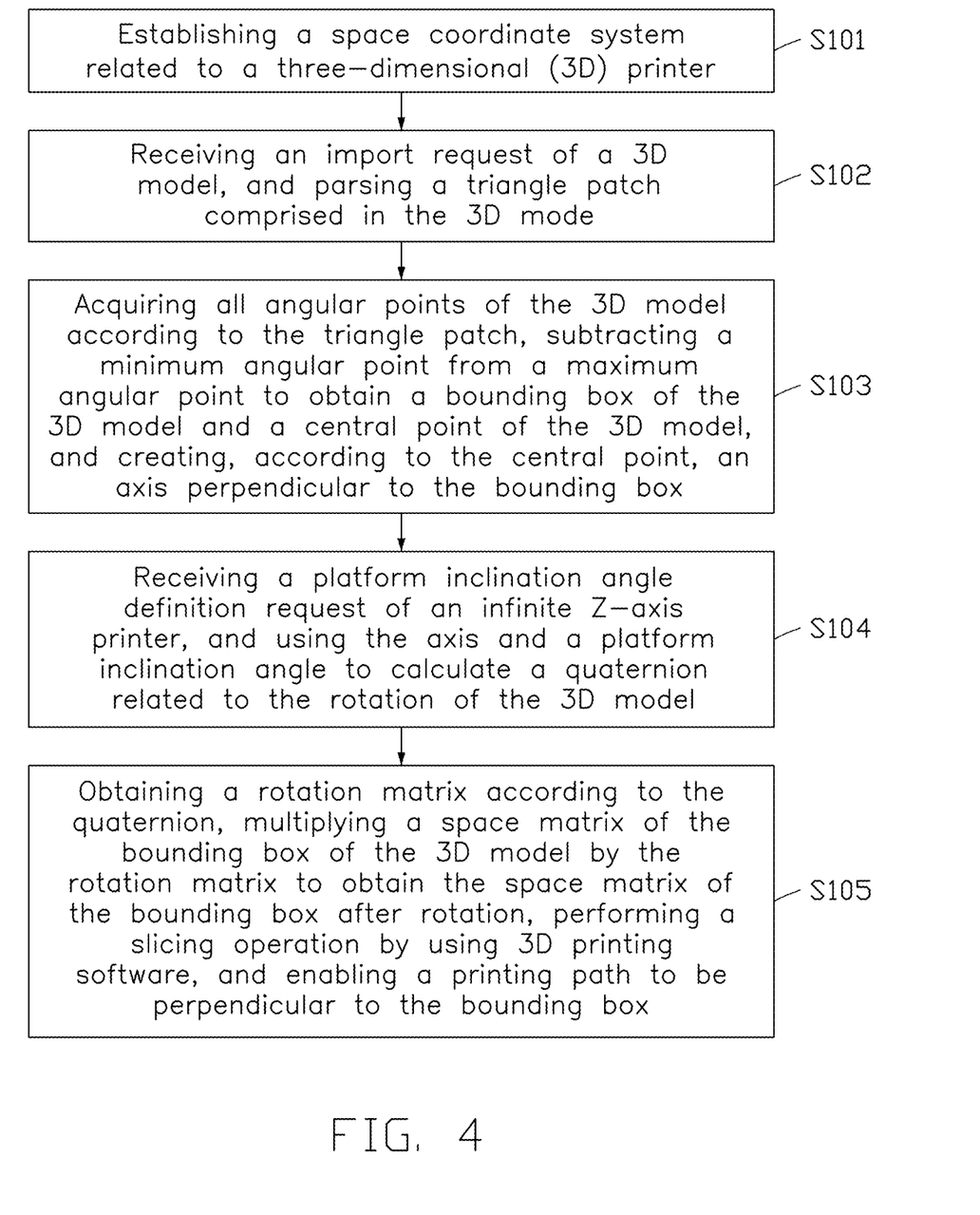
FIG. 4 is a flowchart of the method for automatically improving printing effect according to an embodiment of the present disclosure.

Referring to FIGS. 1 to 4, FIGS. 1 to 3 are application scenario diagrams of a method for automatically improving printing effect in accordance with an embodiment of the present disclosure; FIG. 4 is a flowchart of the method for automatically improving printing effect in accordance with an embodiment of the present disclosure. As shown in the figure, the method for automatically improving printing effect of the present disclosure is applied to a three-dimensional (3D) printer, and the method is executed by a computer program installed in the 3D printer, the 3D printer interacts with the user terminal, the user terminal can be a user device with information receiving and sending functions, such as a desktop computer, notebook computer, tablet computer, or smartphone. The 3D printer can obtain 3D model data from the user to achieve printing.

As shown in FIG. 4, the embodiment of the present disclosure provides a method for automatically improving the printing effect, including the following steps:

At step S101, establishing a space coordinate system related to a three-dimensional (3D) printer.

At step S102, receiving an import request of a 3D model, and parsing a triangle patch comprised in the 3D model.

In the embodiment, due to the need to implement the import model, which automatically maintains a consistent tilt angle with the platform, it is necessary to establish a coordinate system to create a reference object for the tilt angle, step S101 establishes a space coordinate system related to the 3D printer, which can be an X-Y-Z coordinate system. The 3D models include, but are not limited to, model files in STL format.

At step S103, acquiring all angular points of the 3D model according to the triangle patch, subtracting a minimum angular point from a maximum angular point to obtain a bounding box of the 3D model and a central point of the 3D model, and creating, according to the central point, an axis perpendicular to the bounding box.

In the embodiment, the step of subtracting a minimum angular point from a maximum angular point to obtain a bounding box of the 3D model and a central point of the 3D model further includes calculating a space matrix of the bounding box based on a space coordinate system, due to the 3D model to be printed needs to be read and printed on a 3D printer in a data format, in this example, the model is processed in the form of a space matrix.

In some embodiments, the number of space matrices can be several, and together they form a three-dimensional model in an associated combination to facilitate printer processing of the data.

At step S104, receiving a platform inclination angle definition request of the 3D printer, and using the axis and a platform inclination angle to calculate a quaternion related to the rotation of the 3D model.

In the embodiment, the quaternion is a way to describe the posture in three-dimensional space, and the quaternion is composed of a real number and an imaginary number unit I, $i^2=-1$. Similarly, the quaternions are composed of the real number plus three imaginary units i, j, and k, and they have the following relationship: $i^2=j^2=k^2=1$, $i^0=j^0=k^0=1$, each quaternion is a linear combination of 1, i, j, and k, and a quaternion can generally be expressed as a+bi+cj+dk, and a, b, c, and d are real numbers. In the embodiment, the quaternion takes the cosine value of the platform inclination angle, the product of the axis X coordinate and the sine value of the platform inclination angle, the product of the axis Y coordinate and the sine value of the platform inclination angle, and the product of the axis Z coordinate and the sine value of the platform inclination angle as the real numbers, to accurately calculate the rotation angle.

At step S105, obtaining a rotation matrix according to the quaternion, multiplying a space matrix of the bounding box of the 3D model by the rotation matrix to obtain the space matrix of the bounding box after rotation, performing a slicing operation by using 3D printing software, and enabling a printing path to be perpendicular to the bounding box.

The space matrix of the bounding box after rotation needs to be applied to a 3D printer for source data reading as a model to be printed.

In some embodiments, the rotation matrix can be derived from the quaternion, and the derivation process can be implemented with reference to existing technologies (such as the related "Mutual derivation process of quaternions and rotation matrices" in the CSDN forum), which will not be described in detail here.

Figure 1:
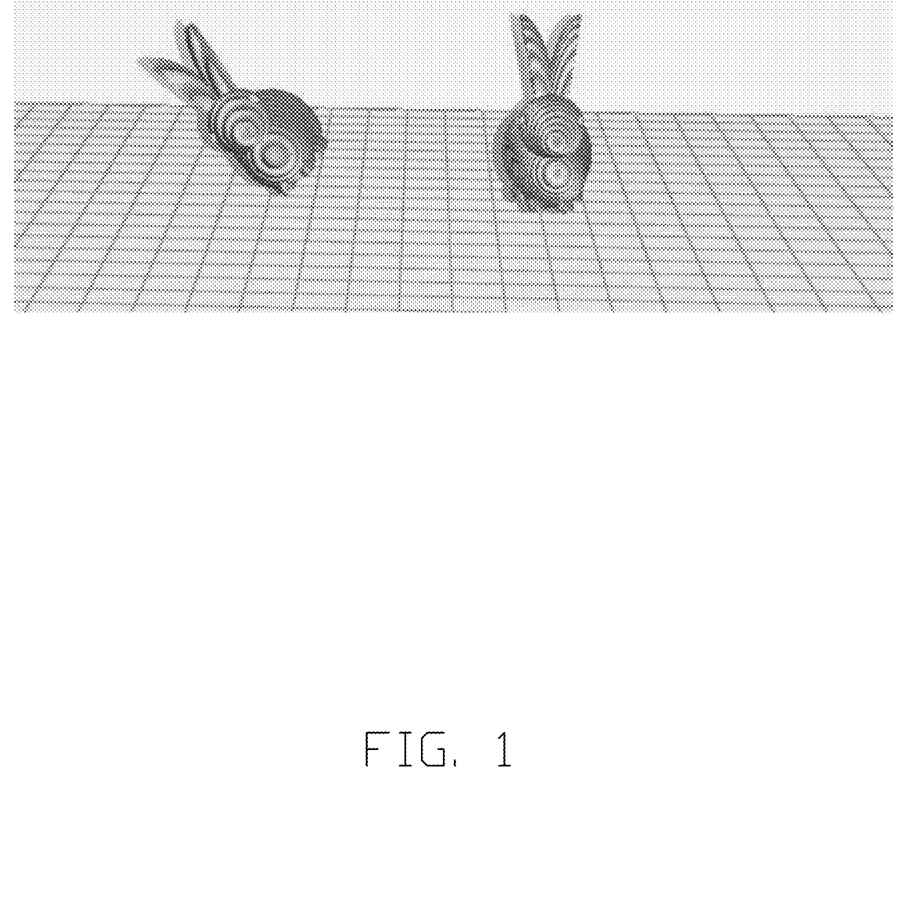
FIG. 1 is a scenario diagram of a method for automatically improving printing effect according to an embodiment of the present disclosure.

Referring to FIGS. 1 to 3, the print model on the left is an object that uses the above steps to achieve vertical printing, while the print model on the right is an object printed using conventional methods, it is not difficult to find that using the method to print has the best printing effect, and therefore, the beneficial effects of this method have been confirmed.

Figure 5:
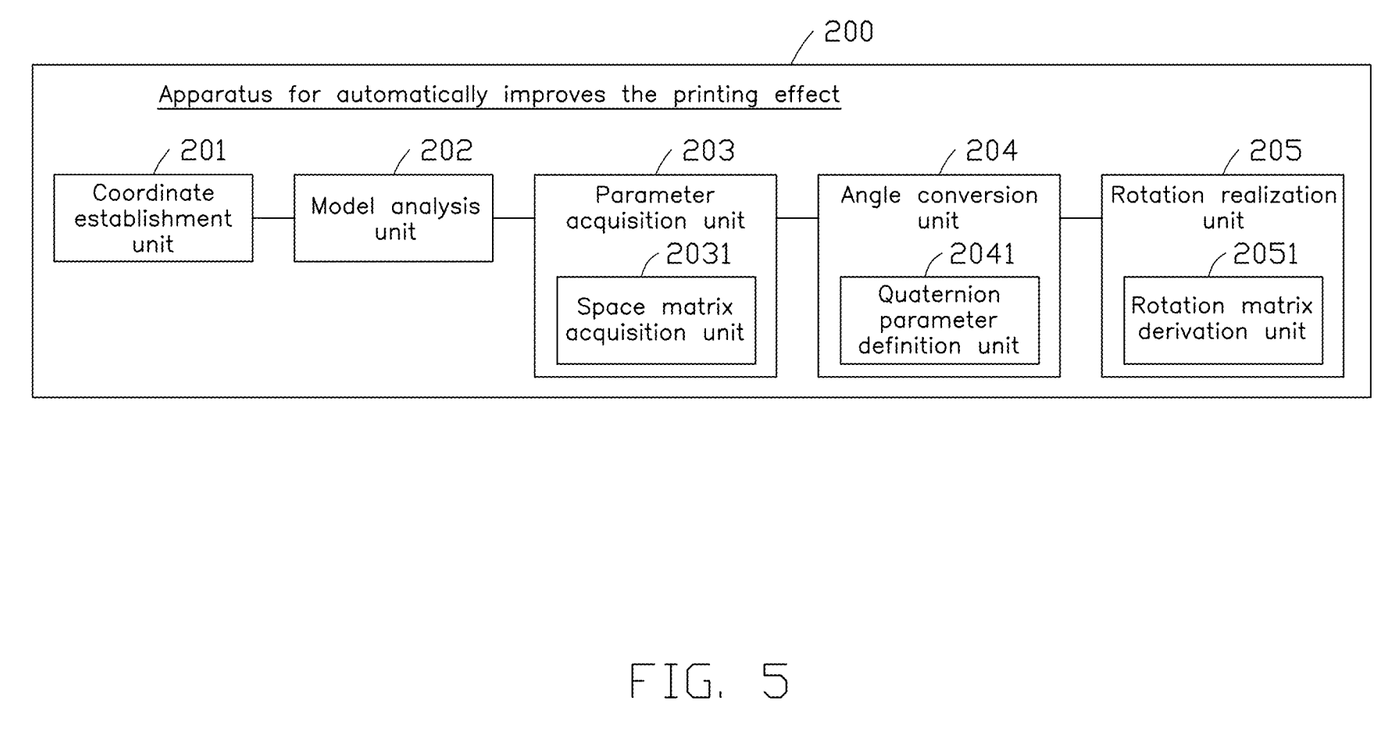
FIG. 5 is a schematic diagram of an apparatus for automatically improving printing effect according to an embodiment of the present disclosure.

FIG. 5 is a schematic diagram of an apparatus for automatically improving printing effect in accordance with an embodiment of the present disclosure. As shown in FIG. 5, the present disclosure also provides an apparatus for automatically improving printing effect corresponding to the above method for automatically improving printing effect. The apparatus for automatically improving printing effect includes a unit for executing the method for automatically improving printing effect described above, and the apparatus can be configured in terminals such as printers, desktop computers, tablets, laptops, and the like. Specifically, please refer to FIG. 5, the present disclosure further provides an apparatus 200 for automatically improves the printing effect, including the following units:

A coordinate establishment unit 201 is used for establishing a space coordinate system related to a 3D printer;

A model analysis unit 202 is used for receiving an import request of a 3D model and parsing a triangle patch comprised in the 3D model;

A parameter acquisition unit 203 is used for acquiring all angular points of the 3D model according to the triangle patch, subtracting a minimum angular point from a maximum angular point to obtain a bounding box of the 3D model and a central point of the 3D model, and creating, according to the central point, an axis perpendicular to the bounding box;

An angle conversion unit 204 is used for receiving a platform inclination angle definition request of the 3D printer, and using the axis and a platform inclination angle to calculate a quaternion related to the rotation of the 3D model;

A rotation realization unit 205 is used for obtaining a rotation matrix according to the quaternion, multiplying a space matrix of the bounding box of the 3D model by the rotation matrix to obtain the space matrix of the bounding box after rotation, performing a slicing operation by using 3D printing software, and enabling a printing path to be perpendicular to the bounding box.

The parameter acquisition unit 203 further includes a space matrix acquisition unit 2031, the space matrix acquisition unit 2031 is for calculating a space matrix of the bounding box based on the space coordinate system. The angle conversion unit 204 further includes a quaternion parameter definition unit 2041, the quaternion parameter definition unit 2041 is used for making the quaternion successively take the cosine value of the platform inclination angle, the product of the axis X coordinate and the sine value of the platform inclination angle, the product of the axis Y coordinate and the sine value of the platform inclination angle, and the product of the axis Z coordinate and the sine value of the platform inclination angle as real numbers. The rotation realization unit 205 further includes a rotation matrix derivation unit 2051, the rotation matrix derivation unit 2051 is used for obtaining a rotation matrix from quaternion derivation.

It should be noted that those skilled in the art can clearly understand that the specific implementation process of the apparatus 200 for automatically improving printing effect and each unit described above can be referred to the corresponding descriptions in the aforementioned method embodiments. For the convenience and simplicity of the description, it will not be repeated here.

Figure 6:
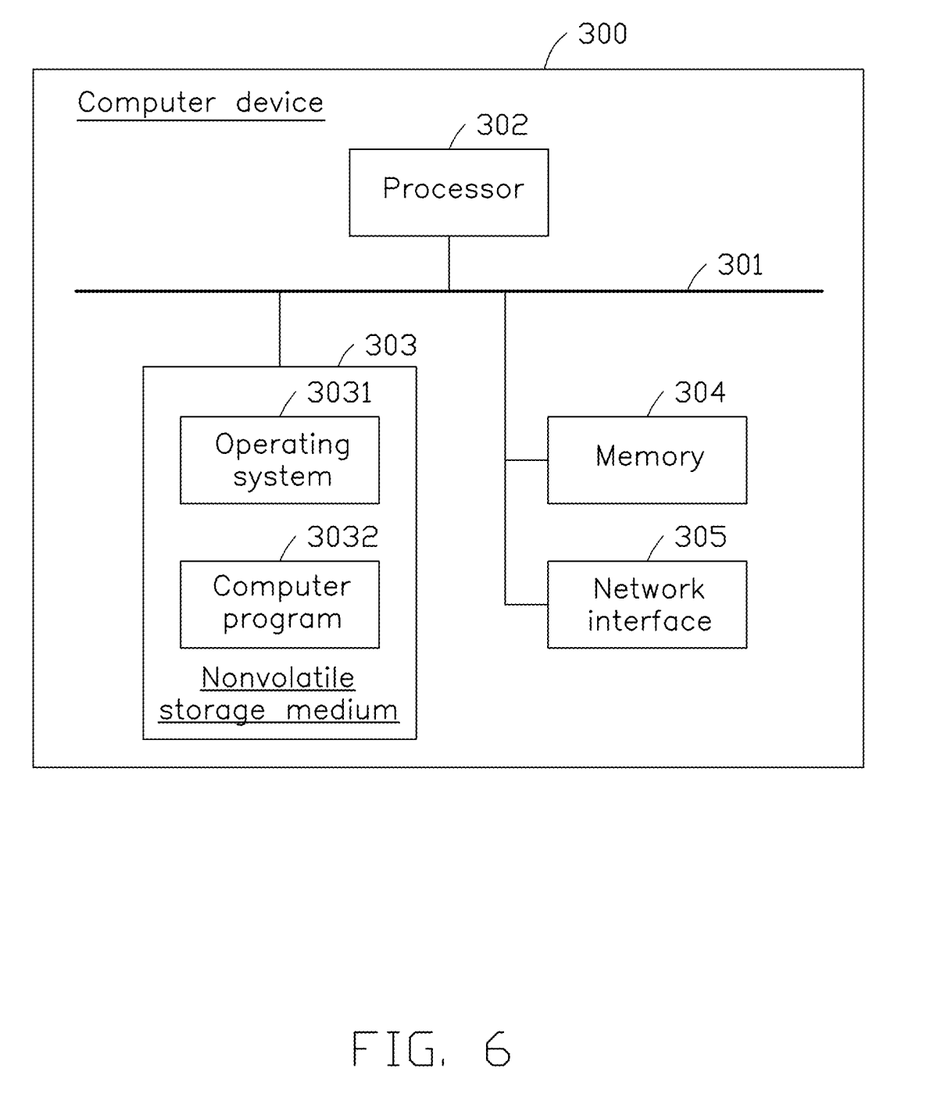
FIG. 6 is a schematic diagram of a computer device according to an embodiment of the present disclosure.

The apparatus for automatically improving printing effect described above can be implemented in the form of a computer program that can be run on a computer device as shown in FIG. 6.

FIG. 6 is a schematic diagram of a computer device in accordance with an embodiment of the present disclosure. The computer device 300 can be a server, wherein the server can be an independent server or a server cluster composed of multiple servers.

Referring to FIG. 6, the computer device 300 includes a processor 302 connected through a system bus 301, a storage device, and a network interface 305, the storage device may include a nonvolatile storage medium 303 and a memory 304.

The nonvolatile storage medium 303 can store an operating system 3031 and a computer program 3032. The computer program 3032 includes program instruction, when this program instruction is executed, it can cause the processor 302 to execute a method for automatically improving printing effect.

The processor 302 is used to provide computing and control capabilities to support the operation of the entire computer device 300.

The memory 304 provides an environment for the operation of the computer programs 3032 in the nonvolatile storage medium 303. When the computer program 3032 are executed by the processor 302, the processor 302 can execute a method for automatically improving printing effect.

The network interface 305 is used for network communication with other devices. Those skilled in the art can understand that the structure shown in FIG. 5 is only a block diagram of some structures related to the present disclosure scheme, and does not constitute a limitation on the computer device 300 to which the present disclosure scheme is applied, a specific computer device 300 may include more or fewer components than shown in the drawing, or combine certain components, or have different component arrangements.

The processor 302 is used to run the computer program 3032 stored in memory to achieve the following steps:

In one embodiment, the processor 302 establishes a space coordinate system related to a 3D printer, receives an import request of a 3D model, and parses a triangle patch comprised in the 3D model; acquires all angular points of the 3D model according to the triangle patch, subtracts a minimum angular point from a maximum angular point to obtain a bounding box of the 3D model and a central point of the 3D model, and creates, according to the central point, an axis perpendicular to the bounding box: receives a platform inclination angle definition request of the 3D printer, and uses the axis and a platform inclination angle to calculate a quaternion related to the rotation of the 3D model; and obtains a rotation matrix according to the quaternion, multiplies a space matrix of the bounding box of the 3D model by the rotation matrix to obtain the space matrix of the bounding box after rotation, performs a slicing operation by using 3D printing software, and enables a printing path to be perpendicular to the bounding box.

It should be understood that in the embodiment of the present disclosure, the processor 302 can be a central processing unit (CPU), and the processor 302 can also be other general-purpose processors, digital signal processors (DSP), application specific integrated circuits (ASICs), field programmable gate arrays (FPGAs), or other programmable logic devices Discrete gate or transistor logic devices, discrete hardware components, etc. The general-purpose processor may be a micro-processor or the processor may also be any conventional processor or the like.

Those skilled in the art can understand that all or part of the processes in the method of implementing the above embodiments can be completed by instructing the relevant hardware through a computer program. The computer program includes program instructions, and the computer program can be stored in a storage medium that is a computer readable storage medium. The program instructions are executed by at least one processor in the computer system to implement the steps of the embodiment of the method described above. Therefore, the present disclosure also provides a storage medium, the storage medium may be a computer readable storage medium. The storage medium stores a computer program, wherein the computer program includes program instructions. When this program instructions are executed by the processor, the processor executes the following steps:

In one embodiment, the processor executes the program instructions to establish a space coordinate system related to a 3D printer, receive an import request of a 3D model, and parse a triangle patch comprised in the 3D model; acquire all angular points of the 3D model according to the triangle patch, subtract a minimum angular point from a maximum angular point to obtain a bounding box of the 3D model and a central point of the 3D model, and create, according to the central point, an axis perpendicular to the bounding box; receive a platform inclination angle definition request of the 3D printer, and use the axis and a platform inclination angle to calculate a quaternion related to the rotation of the 3D model; and obtain a rotation matrix according to the quaternion, multiply a space matrix of the bounding box of the 3D model by the rotation matrix to obtain the space matrix of the bounding box after rotation, perform a slicing operation by using 3D printing software, and enable a printing path to be perpendicular to the bounding box.

The storage medium can be a USB flash disk, a removable hard disk, a read only memory (ROM), a magnetic disk, or an optical disk, and various computer readable storage medium that can store program code.

Those skilled in the art can realize that the units and algorithm steps of each example described in connection with the embodiments disclosed herein can be implemented in electronic hardware, computer software, or a combination of both, in order to clearly illustrate the interchangeability of hardware and software, the composition and steps of each example have been described in general terms of function in the above description. Whether these functions are performed in hardware or software depends on the specific application and design constraints of the technical solution. The professionals can use different methods to achieve the described functions for each specific application, but such implementation should not be considered beyond the scope of the present disclosure.

In the several embodiments provided by the present disclosure, it should be understood that the disclosed devices and methods can be implemented in other ways. For example, the device embodiments described above are only illustrative. For example, the division of each unit is only a logical function division, and there can be other division methods during actual implementation. For example, multiple units or components can be combined or integrated into another system, or some features can be ignored or not implemented.

The steps in the method of the embodiment of the present disclosure can be sequentially adjusted, merged, and deleted according to actual needs. The units in the embodiment device of the present disclosure can be merged, divided, and deleted according to actual needs. In addition, in various embodiments of the present disclosure, each functional unit can be integrated in a single processing unit, or each unit can physically exist alone, or two or more units can be integrated in a single unit.

If the integrated unit is implemented as a software functional unit and sold or used as an independent product, it can be stored in a storage medium. Based on this understanding, the technical solution of the present disclosure can be embodied in the form of software products in essence or in part as a contribution to the prior art, the computer software product is stored in a storage medium and includes several instructions to enable a computer device (which can be a personal computer, a terminal, or a network device, etc.) to perform all or part of the steps of the method described in various embodiments of the present disclosure.

The above is only a specific embodiment of the present disclosure, but the scope of protection of the present disclosure is not limited thereto. Any skilled person familiar with the technical field can easily think of various equivalent modifications or replacements within the technical scope disclosed by the present disclosure, and these modifications or replacements should be covered by the scope of protection of the present disclosure. Therefore, the protection scope of the present disclosure shall be subject to the protection scope of the claims.

What is claimed is:

1. A method for automatically improving printing effect applied to a three-dimensional (3D) printer and comprising:
   establishing a space coordinate system related to a 3D printer;
   receiving an import request of a 3D model and parsing a triangle patch comprised in the 3D model;
   obtaining all angular points of the 3D model according to the triangle patch, subtracting a minimum angular point from a maximum angular point to obtain a bounding box of the 3D model and a central point of the 3D model, and creating, according to the central point, an axis perpendicular to the bounding box;
   receiving a platform inclination angle definition request of the 3D printer and using the axis and a platform inclination angle to calculate a quaternion related to the rotation of the 3D model; and
   obtaining a rotation matrix according to the quaternion, multiplying a space matrix of the bounding box of the 3D model by the rotation matrix to obtain the space matrix of the bounding box after rotation, performing a slicing operation by using a 3D printing software, and enabling a printing path to be perpendicular to the bounding box.

2. The method for automatically improving printing effect according to claim 1, wherein subtracting a minimum angular point from a maximum angular point to obtain a bounding box of the 3D model and a central point of the 3D model, comprises:
   calculating the space matrix of the bounding box based on the space coordinate system.

3. The method for automatically improving printing effect according to claim 2, wherein using the axis and a platform inclination angle to calculate a quaternion related to the rotation of the 3D model, comprises:
   making the quaternion successively take a cosine value of the platform inclination angle, a product of an axis X coordinate and a sine value of the platform inclination angle, a product of an axis Y coordinate and the sine value of the platform inclination angle, and a product of an axis Z coordinate and the sine value of the platform inclination angle as real numbers.

4. The method for automatically improving printing effect according to claim 3, wherein obtaining a rotation matrix according to the quaternion, comprises:
   deriving the rotation matrix from the quaternion.

5. A computer device comprising;
   a memory; and
   a processor;
   wherein the memory stores a computer program, and when the processor executes the computer program, the method for automatically improving printing effect in claim 1 is implemented.

6. A storage medium storing a computer program, wherein the computer program comprises at least one program instruction, when the processor executes the program instruction, the method for automatically improving printing effect in any one of claim 1 is implemented.

7. An apparatus for automatically improving printing effect comprising:
   a coordinate establishment unit configured for establishing a space coordinate system related to a 3D printer;
   a model analysis unit configured for receiving an import request of a 3D model and parsing a triangle patch comprised in the 3D model;
   a parameter acquisition unit configured for obtaining all angular points of the 3D model according to the triangle patch, subtracting a minimum angular point from a maximum angular point to obtain a bounding box of the 3D model and a central point of the 3D model, and creating, according to the central point, an axis perpendicular to the bounding box;
   an angle conversion unit configured for receiving a platform inclination angle definition request of the 3D printer and using the axis and a platform inclination angle to calculate a quaternion related to the rotation of the 3D model; and
   a rotation realization unit configured for obtaining a rotation matrix according to the quaternion, multiplying a space matrix of the bounding box of the 3D model by the rotation matrix to obtain the space matrix of the bounding box after rotation, performing a slicing operation by using a 3D printing software, and enabling a printing path to be perpendicular to the bounding box.

8. The apparatus for automatically improving printing effect according to claim 7, wherein the parameter acquisition unit comprises a space matrix acquisition unit, the space matrix acquisition unit is configured to calculate the space matrix of the bounding box based on the space coordinate system.

9. The apparatus for automatically improving printing effect according to claim 7, wherein the angle conversion unit comprises a quaternion parameter definition unit, the quaternion parameter definition unit is configured to make the quaternion successively take a cosine value of the platform inclination angle, a product of an axis X coordinate and a sine value of the platform inclination angle, a product of an axis Y coordinate and the sine value of the platform inclination angle, and a product of an axis Z coordinate and the sine value of the platform inclination angle as real numbers.

10. The apparatus for automatically improving printing effect according to claim 7, wherein the rotation realization unit comprises a rotation matrix derivation unit, the rotation matrix derivation unit is configured to derivates the rotation matrix from the quaternion.

* * * * *